US010650190B2

(12) United States Patent
Roychoudhury et al.

(10) Patent No.: US 10,650,190 B2
(45) Date of Patent: May 12, 2020

(54) SYSTEM AND METHOD FOR RULE CREATION FROM NATURAL LANGUAGE TEXT

(71) Applicant: Tata Consultancy Services Limited, Mumbai (IN)

(72) Inventors: Suman Roychoudhury, Pune (IN); Nikhil Narendra Bellarykar, Pune (IN); Vinay Kulkarni, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 87 days.

(21) Appl. No.: 15/646,891

(22) Filed: Jul. 11, 2017

(65) Prior Publication Data

US 2019/0018833 A1 Jan. 17, 2019

(51) Int. Cl.
*G06F 16/33* (2019.01)
*G06F 16/36* (2019.01)
*G06F 40/211* (2020.01)
*G06F 40/253* (2020.01)
*G06F 40/284* (2020.01)
*G06F 40/30* (2020.01)

(52) U.S. Cl.
CPC ........ *G06F 40/211* (2020.01); *G06F 16/3344* (2019.01); *G06F 16/36* (2019.01); *G06F 40/253* (2020.01); *G06F 40/284* (2020.01); *G06F 40/30* (2020.01)

(58) Field of Classification Search
CPC ... G06F 16/36; G06F 16/3344; G06F 17/2705
See application file for complete search history.

(56) References Cited

U.S. PATENT DOCUMENTS

| 9,244,909 B2 * | 1/2016 | Ng Tari | G06F 40/253 |
| 2006/0025987 A1 * | 2/2006 | Baisley | G06F 40/211 |
| | | | 704/4 |

(Continued)

OTHER PUBLICATIONS

Roychoudhury, S., Kulkarni, V., & Bellarykar, N. (Oct. 2015). Analyzing Document Intensive Business Processes using Ontology. In Proceedings of the 24th ACM International on Conference on Information and Knowledge Management (pp. 1899-1902). ACM.*

*Primary Examiner* — Bryan S Blankenagel
(74) *Attorney, Agent, or Firm* — Finnegan, Henderson, Farabow, Garrett & Dunner LLP

(57) ABSTRACT

Techniques for rule creation from natural language text (NLT) are disclosed. In an embodiment, a rule statement in the NLT is grammatically parsed to obtain a parse tree. Further, each of noun phrase (NP) core sub-tree and verb phrase (VP) core sub-tree, in the parse tree, is partitioned into at least one sub-tree. Furthermore, one or more operators are extracted using at least one sub-tree of NP or VP core sub-trees. The rule statement is substantially simultaneously splitted into groups of 3 adjacent words (3-grams). Each of the 3-grams is then compared with a predefined list to extract data properties and class concepts associated with the rule statement. Moreover, subscripts are assigned to the data properties, class concepts and operators. A rule head is then created based on the data properties and operators. Also, a rule is created using the data properties, operators, class concepts, associated subscripts and rule head.

9 Claims, 4 Drawing Sheets

| S.NO | NATURAL LANGUAGE RULE STATEMENT | CORRESPONDING SWRL RULE STATEMENT |
|---|---|---|
| 1 | INVOICE NUMBER AND THE BOOKING NUMBER MENTIONED IN THE BILL OF LADING SHOULD MATCH WITH EACH OTHER. | BILLOFLADING(?P), INVOICENUMBER(?P, ?R), BOOKINGNUMBER(?P, ?Q), EQUAL(?Q, ?R) |
| 2 | IN THE BILL OF LADING, THE TOTAL WEIGHT OF THE SHIPPING ITEMS IS EQUAL TO THAT OF THE ITEMS ORDERED BY THE CUSTOMER. | ADD(?T, ?Q, ?R), ITEMWEIGHT(COILSSHIPPERITEM, ?R), BILLOFLADING(?S), SHIPPERITEM(?P), ITEMWEIGHT(BILLETSSHIPPERITEM, ?Q) -> CALCULATED TOTAL WEIGHT(?S, ?T) & BILLOFLADING(?P), EQUAL(?Q, ?R) TOTALITEMWEIGHT(?P, ?R), CALCULATEDTOTALWEIGHT(?P, ?Q) -> ITEMWEIGHTEQUAL(?P, TRUE) |
| 3 | THE WORDS "ABOUT", "APPROXIMATELY", "CIRCA" OR SIMILAR EXPRESSIONS USED IN CONNECTION WITH THE AMOUNT OF THE CREDIT OR THE QUANTITY OR THE UNIT PRICE STATED IN THE CREDIT ARE TO BE CONSTRUED AS ALLOWING A DIFFERENCE NOT TO EXCEED 10% MORE OR 10% LESS THAN THE AMOUNT OR THE QUANTITY OR THE UNIT PRICE TO WHICH THEY PREFER. | 1. LETTEROFCREDIT(?P), ITEMPRICE(?P, ?R), MULTIPLY(?S, 1.1, ?R) -> TP1(?P,?S) & LETTEROFCREDIT(?P), TP1(?P,?R), COMMERICALINVOICE(?S), TOTALITEMWEIGHT(?S,?T), LESSTHANOREQUAL(?P,?T) -> PRICEDIFFERENCENOTEXCEED(?P,TRUE) 2. LETTEROFCREDIT(?P), TOTALITEMWEIGHT(?P,?R), MULTIPLY(?S, 0.9, ?R) ->TP(?P,?S) & LETTEROFCREDIT(?P), TP(?P,?R), BILLOFLADING(?S), TOTALITEMWEIGHT(?S,?T), GREATERTHANOREQUAL(?P,?T) -> WEIGHTDIFFERENCENOTEXCEED(?P,TRUE) |

200

(56) References Cited

U.S. PATENT DOCUMENTS

| | | | |
|---|---|---|---|
| 2007/0239435 A1* | 10/2007 | Stuhec | G06F 40/289 704/9 |
| 2015/0347375 A1* | 12/2015 | Tremblay | G06F 16/367 704/9 |
| 2015/0378984 A1* | 12/2015 | Ateya | G06F 16/3344 707/769 |
| 2016/0117312 A1 | 4/2016 | Bateman et al. | |
| 2016/0203177 A1* | 7/2016 | Taubman | G06F 16/24 707/758 |
| 2016/0217128 A1* | 7/2016 | Baum | G06F 17/2775 |
| 2016/0364426 A1* | 12/2016 | Schroetel | G06F 16/907 |
| 2017/0315984 A1* | 11/2017 | Goyal | G06F 17/277 |
| 2018/0082183 A1* | 3/2018 | Hertz | G06Q 10/10 |
| 2018/0260472 A1* | 9/2018 | Kelsey | G06F 40/211 |

* cited by examiner

| S.NO | NATURAL LANGUAGE RULE STATEMENT | CORRESPONDING SWRL RULE STATEMENT |
|---|---|---|
| 1 | INVOICE NUMBER AND THE BOOKING NUMBER MENTIONED IN THE BILL OF LADING SHOULD MATCH WITH EACH OTHER. | BILLOFLADING(?P), INVOICENUMBER(?P, ?R), BOOKINGNUMBER(?P, ?Q), EQUAL(?Q, ?R) |
| 2 | IN THE BILL OF LADING, THE TOTAL WEIGHT OF THE SHIPPING ITEMS IS EQUAL TO THAT OF THE ITEMS ORDERED BY THE CUSTOMER. | ADD(?T, ?Q, ?R), ITEMWEIGHT(COILSSHIPPERITEM, ?R), BILLOFLADING(?S), SHIPPERITEM(?P), ITEMWEIGHT(BILLETSSHIPPERITEM, ?Q) -> CALCULATED TOTAL WEIGHT(?S, ?T) & BILLOFLADING(?P), EQUAL(?Q, ?R) TOTALITEMWEIGHT(?P, ?R), CALCULATEDTOTALWEIGHT(?P, ?Q) -> ITEMWEIGHTEQUAL(?P, TRUE) |
| 3 | THE WORDS "ABOUT", "APPROXIMATELY", "CIRCA" OR SIMILAR EXPRESSIONS USED IN CONNECTION WITH THE AMOUNT OF THE CREDIT OR THE QUANTITY OR THE UNIT PRICE STATED IN THE CREDIT ARE TO BE CONSTRUED AS ALLOWING A DIFFERENCE NOT TO EXCEED 10% MORE OR 10% LESS THAN THE AMOUNT OR THE QUANTITY OR THE UNIT PRICE TO WHICH THEY PREFER. | 1. LETTEROFCREDIT(?P), ITEMPRICE(?P, ?R), MULTIPLY(?S, 1.1, ?R) -> TP1(?P,?S) & LETTEROFCREDIT(?P), TP1(?P,?R), COMMERICALINVOICE(?S), TOTALITEMWEIGHT(?S,?T), LESSTHANOREQUAL(?P,?T) -> PRICEDIFFERENCENOTEXCEED(?P,TRUE) 2. LETTEROFCREDIT(?P), TOTALITEMWEIGHT(?P,?R), MULTIPLY(?S, 0.9, ?R) ->TP(?P,?S) & LETTEROFCREDIT(?P), TP(?P,?R), BILLOFLADING(?S), TOTALITEMWEIGHT(?S,?T), GREATERTHANOREQUAL(?P,?T) -> WEIGHTDIFFERENCENOTEXCEED(?P,TRUE) |

FIG. 2

```
FOR ASSERTIVE SENTENCE (ROOT
  (S
    (NP
      (NP (JJ invoice) (NN number))
      (CC and)
      (NP
        (NP (DT the) (NN booking) (NN number))
        (VP (VBN mentioned)
          (PP (IN in)
            (NP
              (NP (DT the) (NN bill))
              (PP (IN of)
                (NP (NNP lading))))))))
    (VP (MD should)
      (VP (VB match)
        (PP (IN with))
          (NP (DT each) (JJ other))))
    (. .)))
```

FIG. 4

```
FOR CONDITIONAL SENTENCE (ROOT
  (S
    (SBAR (IN IF)
      (S
        (NP
          (NP (DT the) (NN item) (NN description))
          (PP (IN in)
            (NP (NNP BOL))))
        (VP (VBZ matches)
          (NP (DT the) (JJ detrimental) (NN description))
          (PP (VBN given)
            (PP (IN in)
              (NP (NNP UCP) (CD 600) (NN document)))))))
    (, ,)
    (VP (VB do) (RB n't)
      (VP (VB approve)
        (NP (DT the) (NN item))))
    (. .)))
```

FIG. 5

SYSTEM AND METHOD FOR RULE CREATION FROM NATURAL LANGUAGE TEXT

TECHNICAL FIELD

The embodiments herein generally relate to rule creation, and, more particularly, to system and method for rule creation from natural language text.

BACKGROUND

Generally, many enterprise systems have to handle with a large pool of documents that form the part of their core business. Typically, they contain several pieces of information that may have a structured format but generally having unstructured data as its content. The data contained in these documents are governed by rules as laid out in the operational manual of the core business of the enterprise. Therefore, the data contained in the documents symbolizes syntax and business rules available in an operational handbook of the enterprise. Both the business rules along with the data are present in unstructured natural language text (pool of documents) that in existing approaches is manually interpreted and verified by humans. Moreover, manual verification may take a considerable amount of time and effort when one has to go through a large pool of documents and any human verification and interpretation of rules may be subjected to unavoidable errors.

SUMMARY

Embodiments of the present disclosure present technological improvements as solutions to one or more of the above-mentioned technical problems recognized by the inventors in conventional systems. In view of the foregoing, embodiments herein provide a system and method for rule creation from natural language text.

In one embodiment, a method for rule creation from natural language text is disclosed. In this embodiment, the method includes the steps of: grammatical parsing, by one or more hardware processors, a rule statement in natural language text to obtain a parse tree, wherein the parse tree comprises a noun phrase core sub-tree and a verb phrase core sub-tree; partitioning, by the one or more hardware processors, each of the noun phrase core sub-tree and verb phrase core sub-tree into at least one sub-tree; extracting, by the one or more hardware processors, at least one operator using the at least one sub-tree of at least one of the noun phrase core sub-tree and verb phrase core sub-tree; substantially simultaneously splitting, by the one or more hardware processors, the rule statement into groups of 3 adjacent words (3-grams); comparing, by the one or more hardware processors, each of the 3-grams with a predefined list of classes and data properties in an ontological representation to extract data properties and class concepts associated with the rule statement; assigning, by the one or more hardware processors, subscripts to the extracted data properties, class concepts and the at least one operator; creating, by the one or more hardware processors, a rule head based on the extracted data properties and the at least one operator; and creating, by the one or more hardware processors, a rule using the data properties, the at least one operator, the class concepts, the associated subscripts and the rule head.

In another embodiment, a system for rule creation from natural language text is disclosed. In this embodiment, the system includes one or more hardware processors and one or more memories communicatively coupled to the processors, wherein the one or more hardware processors are configured to execute programmed instructions stored in the one or more memories to: grammatical parse a rule statement in natural language text to obtain a parse tree, wherein the parse tree comprises a noun phrase core sub-tree and a verb phrase core sub-tree; partition each of the noun phrase core sub-tree and verb phrase core sub-tree into at least one sub-tree; extract at least one operator using the at least one sub-tree of at least one of the noun phrase core sub-tree and verb phrase core sub-tree; substantially simultaneously split the rule statement into groups of 3 adjacent words (3-grams); compare each of the 3-grams with a predefined list of classes and data properties in an ontological representation to extract data properties and class concepts associated with the rule statement; assign subscripts to the extracted data properties, class concepts and the at least one operator; create a rule head based on the extracted data properties and the at least one operator; and create a rule using the data properties, the at least one operator, the class concepts, the associated subscripts and the rule head.

In yet another embodiment, a non-transitory computer readable medium embodying a program executable in a computing device is disclosed. In this embodiment, the program includes a program code for grammatical parsing a rule statement in natural language text to obtain a parse tree, wherein the parse tree comprises a noun phrase core sub-tree and a verb phrase core sub-tree; a program code for partitioning each of the noun phrase core sub-tree and verb phrase core sub-tree into at least one sub-tree; a program code for extracting at least one operator using the at least one sub-tree of at least one of the noun phrase core sub-tree and verb phrase core sub-tree; a program code for substantially simultaneously splitting the rule statement into groups of 3 adjacent words (3-grams); a program code for comparing each of the 3-grams with a predefined list of classes and data properties in an ontological representation to extract data properties and class concepts associated with the rule statement; a program code for assigning subscripts to the extracted data properties, class concepts and the at least one operator; a program code for creating a rule head based on the extracted data properties and the at least one operator; and a program code for creating a rule using the data properties, the at least one operator, the class concepts, the associated subscripts and the rule head.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2 illustrates a table including natural language statements and corresponding semantic web rules language (SWRL) statements, according to some embodiments of the present disclosure.

FIG. 4 illustrates VP sub-tree selection for assertive sentence.

FIG. 5 illustrates VP sub-tree selection for conditional sentence.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The terms "class" and "class concepts" are used interchangeably throughout the document.

The present subject matter discloses a technique for rule creation from natural language text. The technique uses ontology based knowledge representation techniques along with natural language processing methods to extract operational rules from business documents. In an embodiment, a rule statement in natural language text is grammatically parsed. Further, a parse tree in an xml file of parsed sentence is accessed. Furthermore, the parse tree is partitioned into sub-trees (a noun phrase sub-tree and a verb phrase sub-tree). Moreover, a verb phrase is extracted using the verb phrase sub-tree to extract verb phrases and hence, semantic web rules language (SWRL) operator. Also, the entire sentence is splitted into 3 adjacent words (3-grams) and then, data properties and classes are extracted using 3-grams. In addition, appropriate subscripts are assigned to the operator and extracted data properties and classes. A rule head is then constructed using the operator and extracted data properties and classes and associated subscripts. Further, a rule is then created based on the operator, data properties, classes, associated subscripts and the rule head. In some embodiments, the above described rule based framework enables automatic verification of document based systems using suitable reasoning engines.

Figure 1:
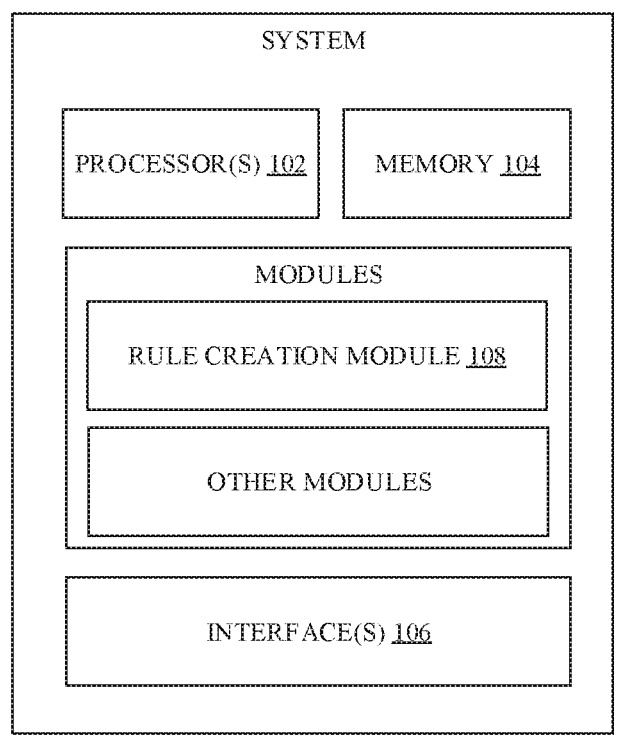
FIG. 1 illustrates a system for rule creation from natural language text, according to some embodiments of the present disclosure.

FIG. 1 illustrates a system 100 for rule creation from natural language text, according to some embodiments of the present disclosure. As shown in FIG. 1, the system 100 includes one or more processor(s) 102 and memory or memories 104 communicatively coupled to each other. The system 100 also includes interface(s) 106. Further, the memory 104 includes a rule creation module 108 and other modules. Although FIG. 1 shows example components of the system 100, in other implementations, the system 100 may contain fewer components, additional components, different components, or differently arranged components than depicted in FIG. 1.

The processor(s) 102 and the memory 104 may be communicatively coupled by a system bus. The processor(s) 102 may include circuitry implementing, among others, audio and logic functions associated with the communication. The processor(s) 102 may include, among other things, a clock, an arithmetic logic unit (ALU) and logic gates configured to support operation of the processor(s) 102. The processor(s) 102 can be a single processing unit or a number of units, all of which include multiple computing units. The processor(s) 102 may be implemented as one or more hardware processors, microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions and data stored in the memory 104.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 106 may include a variety of software and hardware interfaces, for example, interfaces for peripheral device(s), such as a keyboard, a mouse, an external memory, and a printer. The interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 106 may include one or more ports for connecting the system 100 to other devices.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 104, may store any number of pieces of information, and data, used by the system 100 to implement the functions of the system 100. The memory 104 may be configured to store information, data, applications, instructions or the like for enabling the system 100 to carry out various functions in accordance with various example embodiments. Additionally or alternatively, the memory 104 may be configured to store instructions which when executed by the processor(s) 102 causes the system 100 to behave in a manner as described in various embodiments. The memory 104 includes the rule creation module 108 and other modules. The module 108 include routines, programs, objects, components, data structures, etc., which perform particular tasks or implement particular abstract data types. The other modules may include programs or coded instructions that supplement applications and functions of the system 100.

In operation, the rule creation module 108 extracts and transforms relevant concepts from natural language text to SWRL. Generally, a SWRL rule is like a horn clause including of an antecedent and a consequent (rule head). The antecedent contains various entities like classes, data properties and operators. For example, as shown in a table 200 of FIG. 2, Bill-of-lading is a class concept. Each of entities of table 200 has parameters or subscripts. In SWRL syntax, it is represented within brackets as Billoflading (?p).

Depending upon the type of an entity (i.e., data property or class), it is parameterized with one or more subscripts.

In an embodiment, the rule creation module 108 grammatical parses the rule statement in the natural language form or text. In order to fully exploit grammatical features of the rule statement in the natural language text, the rule creation module 108 parses the rule statement in the natural language form. The rule creation module 108 may use annotators like NER (named entity recognition), Coreference resolution, part-of-speech (POS) tagging, etc for parsing. In an embodiment, a natural language parser (i.e., Stanford Parser) which is a program that works out the grammatical structure of sentences, for instance, which groups of words go together (as "phrases") and which words are the subject or object of a verb is used to do grammatical parsing.

In an example implementation, the rule creation module 108 splits the input sentence into two core sub-trees i.e., a noun phrase (NP) core sub-tree and a verb phrase (VP) core sub-tree. An xml file produced as an output of the parsing include this parse tree, which is used for further processing. An example parse tree and POS tags of input text of the table 200 (i.e., for first sentence) is as follows:

```
(ROOT
  (S
    (NP
      (NP (JJ invoice) (NN number))
      (CC and)
      (NP
        (NP (DT the) (NN booking) (NN number))
        (VP (VBN mentioned)
          (PP (IN in)
            (NP
              (NP (DT the) (NN bill))
              (PP (IN of)
                (NP (NNP lading))))))))
    (VP (MD should)
      (VP (VB match)
        (PP (IN with)
          (NP (DT each) (JJ other)))))
    (..)))
```

Further, the rule creation module 108 accesses the parse tree in the xml file of the parsed sentence. In other words, once the xml file is generated, the rule creation module 108 access the specific parse tree node and process to extract various quantities of interest so as to convert the tree to an equivalent formal representation in SWRL. Furthermore, the rule creation module 108 partition the parse tree into sub-trees for locating the verb phrase within the sentence. The parse tree contains two sub-trees, i.e., noun phrase (NP) and verb phrase (VP), whose structure is implicit in the xml file. Based on the number of opening and closed brackets, the rule creation module 108 extracts sub-trees appropriately. For example, for a simple assertive sentence, of the type "x should be y", the individual sub-trees are atomic, i.e. they do not contain child sub-trees. But for conditional sentences of the type "if x, then y", the NP sub-tree often contains more than one child sub-tree. For example, for an assertive sentence (i.e., first sentence) as shown in the table 200 and a conditional sentence like "If the item description in BOL matches the detrimental description given in UCP 600 document, don't approve the item", the relevant sub-trees are shown below. In case of the assertive sentence, only VP sub-tree is selected (FIG. 4 marked with dotted line) and whereas for the conditional sentence, a first big NP sub-tree (i.e., non-atomic tree) is selected and then a VP sub-tree is selected (FIG. 5).

In addition, the rule creation module 108 uses the VP sub-tree to extract verb phrases and the SWRL operator. Each sub-tree contains a part of the sentence, with POS tag of each word preceding the word itself. The verb phrase has the POS tags like VBD Verb (VB) for past tense, VBG Verb for gerund or present participle, VBN Verb for past participle, VBP Verb for non-3rd person singular present, VBZ Verb for 3rd person singular present, etc., while the beginning of the VP sub-tree is signified by another tag-"VP". Using these properties, the rule creation module 108 extracts the verb phrase. For example, in the assertive sentence, the verb phrase is underlined as shown below.

```
(VP (MD should)
  (VP(VBmatch)
    (PP (IN with)
      (NP (DT each) (JJ other)))))
```

As shown in table 1, the rule creation module 108, for assertive sentences, traverses the parse tree and uses the second child i.e., VP sub-tree for verb phrase (and thereby operator) extraction. As shown in table 2, for conditional sentences, the rule creation module 108 traverses the parse tree and uses the first non-atomic child i.e., (containing more than one sub-tree) for verb extraction and then use the VP sub-tree therein.

The rule creation module 108 then matches the extracted verb phrase with a full list of predefined SWRL operators. The standard form of the operators may or may not match with the verb phrase as it is, hence a synonym list is made for each of the operators and the verb phrase is also matched with the synonym list. The synonym list for the SWRL operator equal is: ("match", "equalize", "equalise", "equate", "equal", "matches", "be equal"). Since the verb phrase matches with an element in the synonym list for operator equal, the rule creation module 108 thereby selects the operator. Moreover, to ensure inexact matching, regular expressions tools like grepl available in "R" are used.

Moreover, the rule creation module 108 substantially simultaneously uses n-grams (3-grams) to extract data properties and classes. In an example implementation, the rule creation module 108 removes one or more words from the natural language statement i.e., words like 'in', 'of', 'the' because those are irrelevant when it comes to matching entities of interest. This is shown in the following table.

| Original sentence | Transformed sentence |
|---|---|
| Invoice number and the booking number mentioned in the Bill of Lading should match with each other | Invoice number and booking number mentioned Bill Lading should match each other. |

Once such words are removed, the rule creation module 108 splits the remaining sentence into 3-grams (groups of 3 adjacent words each) as follows: "and booking number", "match each other", "number mentioned Bill", "number and booking", "Invoice number", "mentioned Bill Lading", "booking number mentioned", "Bill Lading should", "Lading should match", "Invoice number and", "should match each".

Further, the rule creation module 108 compares each 3-gram to a list of classes and a list of data properties as present in their ontological representation. Example key entities in ontology representation of International trade are Banks, Buyer, Seller, Transporter, Ordered Item, Customer Invoice, Shipping Detail, Customer Order Detail etc. Entities have typed properties that are either object types (e.g., hasBank) or data types (hasName). For constructing an ontology describing a particular domain (i.e., International Trade), the domain knowledge is categorized carefully so that the categorization matches the terminology of the ontology. The main ontological constituents of the International Trade domain are described in terms of following entities:

a) Classes are abstract groups into which the objects or their categories can be classified. In this example, each document types in the process, i.e. Letter-of-Credit, Bill-of-Lading, Commercial Invoice etc., is defined as a class.

b) Object Properties are relations (i.e., domain and range) between two classes or objects. Example object properties are hasBuyer, hasSeller, hasItem etc., whose domain is Bill-of-lading and range is Buyer or Seller.

c) Data Properties are atomic attributes of objects. In this example, objects having atomic attributes like "Invoice Number", "price", "Port of Loading" etc. are represented as data properties.

d) Individuals are objects themselves, i.e. the instances of classes. With respect to this example, individuals are actual document instances that are taking part in the buyer-seller transaction, i.e. instances like commercial invoice, bill of lading, customer item etc.

As an example, let two lists of classes and data properties present in the ontology are as follows:
data_properties_list=("Bookingnumber", "Invoicenumber", "ItemDescriptionBOL", "ItemDescriptionInvoice", "DetrimentalDescription", "WeightinCommercialInvoice", "WeightinBOL", "Creditnumber", "PriceinInvoice", "Pricelimit", "Weightlimit")
class_list=("Billoflading", "Letterofcredit", "Packingslist", "Certificateoforigin", "Commercialinvoice", "UCP600").

Furthermore, the rule creation module 108 compares each word within each 3-gram with each member of the class list. If more than one word in the 3-gram match with a member of the class list (i.e. found to be the subset of the entity in the class list), the latter is selected as a match. If more than one member in the class list match with a single 3-gram, the member with least edit distance from the 3-gram is selected. Similarly, the rule creation module 108 compares each word within one of the 3-grams with each member of the predefined list of data properties. Further, a member of the predefined list of data properties is selected as a match when more than one word in one of the 3-grams match with the member of the predefined list of data properties. Furthermore, a member with least edit distance from the one of the 3-grams is selected as a match when more than one member in the predefined list of data properties match with the one of the 3-grams. For example, least edit distance is a standard technique used in dynamic programming for approximate string matching. Using the above process, the entity Billoflading is identified as a class concept whereas the entities Bookingnumber and Invoicenumber are identified as data properties.

Further in operation, the rule creation module 108 assigns appropriate subscripts to extracted entities. Subscripts or parameters are an essential part of the SWRL syntax. In SWRL, classes have only one parameter shown in brackets, i.e., its domain, e.g., BillofLading (?p) while data properties have two parameters, i.e., its domain and range, e.g., Bookingnumber(?p, ?q). From the set of alphabets (i), a number of letters equal to the sum of number of classes, data properties and operator combined is selected. One letter is assigned to every class concept, e.g. BillofLading(?p). Now, of the two parameters for data properties, the first one denotes its domain, i.e., the class to which the property belongs and the second one denotes its range, i.e., its type. From the list of data properties, it is ensured that the same letter is assigned to the data property as its domain class (i.e., the first subscript). Remaining letters are assigned to the range of each data property (i.e., the second subscript). Hence in the light of the given example, the subscripts for the two data properties Bookingnumber and Invoicenumber are as follows: Bookingnumber(?p,?q), Invoicenumber(?p, ?r). Now, assigning subscripts to operators is tricky. For certain commutative operators, e.g. add, multiply, equal, etc., the order of the subscripts does not matter. However, if the operator is a non-commutative one, e.g. LesserThan, GreaterThan, etc., then the order or position of subscript matters. In that case, the whole sentence is again split up along the verb phrase. The part of the sentence after the verb phrase is again separately split into 3-grams and the data properties therein are identified. The second subscript of the operator is selected from the second parameter of the data property in the part of the sentence after the verb phrase whereas the first subscript of the operator is selected from the second parameter of the data property in the part of the sentence before the verb phrase.

To illustrate the embodiment, let us consider the following rule in natural language text: Weight in Bill of lading should not be less than the weight limit in letter of credit. Here, the corresponding SWRL operator extracted from the text is GreaterthanorEqual. Since it is a non-commutative operator, the order of the parameters given to it matters. In this example, WeightinBOL and Weightlimit are the two data properties extracted and Billoflading and Letterofcredit are the two classes extracted. Assume that the data properties have been assigned the following subscripts—WeightinBOL (?p,?r) and Weightlimit(?q,?s). The verb phrase in the sentence is "be". Hence the 3-grams are again constructed for the segment "less than the weight limit in letter of credit". From this segment, the data property extracted is Weightlimit. Hence, the operator have subscripts as GreaterthanorEqual(?r,?s) and not the other way around.

Also, the rule creation module 108 constructs a rule head. In SWRL rules, the rule head is a must. The template for the same is constructed depending upon the type of the sentence: If the sentence is of a simple assertive type, the template is: <data property 1>+<data property 2>++<data property n>+<operator>. i.e., for the given sentence, the data properties are: Invoicenumber and Bookingnumber. The operator extracted is equal. Hence, the rule head is generated as InvoicenumberBookingnumberEqual. However, if the sentence is of a conditional type, the template is: <part of the sentence after the condition>. i.e. for a sentence "If the item description in BOL matches the detrimental description given in UCP 600 document, dont approve the item", the rule head is dontApproveTheItem. The rule head requires only one subscript, i.e., the domain parameter. The parameter associated with any class in the sentence can be used for it.

Once all the entities are appropriately constructed in SWRL syntax, the rule creation module 108 combines them by commas and an arrow before the rule head as follows:
BillOfLading(?p), InvoiceNumber(?p, ?r), BookingNumber (?p, ?q),
equal(?q,?r)→InvoicenumberBookingnumberEqual (?p, true).

Further, the rule creation module 108 sends the created SWRL rule to a suitable reasoning engine (e.g., pellet reasoner) for verification. The table 200 shows several examples of how rules in natural language text (NLT) are represented in SWRL form, which is eventually used by our reasoning engine for automatic verification. It is important to check the system performance periodically based on precision and recall measures such that as progressively more natural language text is parsed and appropriate rules in SWRL syntax are extracted. Moreover, these periodic measurements are used as a feedback to fine tune and improve upon the internal processes used. A few examples of heuristics used are given below— i. For non-commutative operators, the 2nd parameter of the operator is extracted from the part of the sentence after the verb phrase.

ii. For conditional sentences, the entities are extracted only from the first NP sub-tree.

Figure 3:
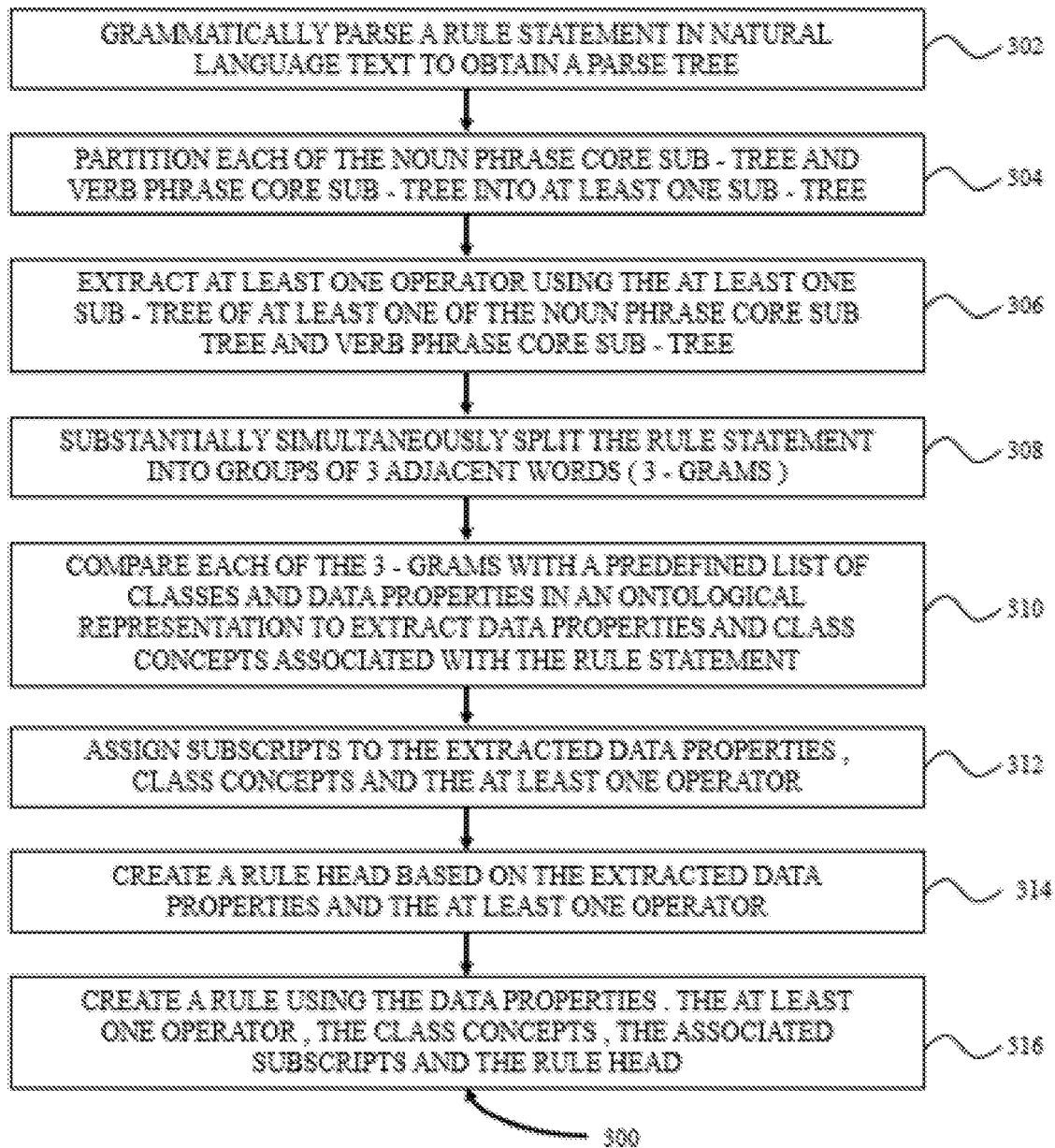
FIG. 3 is a flow chart illustrating a method for rule creation from natural language text, according to some embodiments of the present disclosure.

FIG. 3 is a flow chart illustrating a method 300 for rule creation from natural language text, according to some embodiments of the present disclosure. The processor-implemented method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof. In an embodiment, the method 300 depicted in the flow chart may be executed by a system, for example, the system 100 of FIG. 1.

At block 302, a rule statement in natural language text is grammatically parsed to obtain a parse tree. For example, the parse tree includes a noun phrase core sub-tree and a verb phrase core sub-tree. At block 304, each of the noun phrase core sub-tree and verb phrase core sub-tree is partitioned into one or more sub-trees. At block 306, one or more operators are extracted using the at least one sub-tree of at least one of the noun phrase core sub-tree and verb phrase core sub-tree. In an example implementation, a verb phrase of the rule statement is extracted using the one or more sub-trees of the noun phrase core sub-tree and/or verb phrase core sub-tree. Further, the verb phrase is compared with a predefined set of operators. Furthermore, the one or more operators associated with the verb phrase are extracted based on the comparison. At block 308, the rule statement is substantially simultaneously splitted into groups of 3 adjacent words (3-grams). In an embodiment, irrelevant words are extracted from the rule statement. The rule statement is then splitted into the groups of 3-grams upon removing the irrelevant words.

At block 310, each of the 3-grams is compared with a predefined list of classes and data properties in ontological representation to extract at least one of data properties and class concepts associated with the rule statement. In an example implementation, each word within one of the 3-grams is compared with each member of the predefined list of classes. Further, the class is extracted by a) selecting a member of the predefined list of classes as a match when more than one word in one of the 3-grams match with the member of the predefined list of classes and b) selecting a member with least edit distance from the one of the 3-grams as a match when more than one member in the predefined list of classes match with the one of the 3-grams. In another example implementation, each word within one of the 3-grams is compared with each member of the predefined list of data properties. Further, the data property is extracted by a) selecting a member of the predefined list of data properties as a match when more than one word in one of the 3-grams match with the member of the predefined list of properties and b) selecting a member with least edit distance from the one of the 3-grams as a match when more than one member in the predefined list of properties match with the one of the 3-grams.

At block 312, subscripts are assigned to the extracted data properties, class concepts and operators. For example, a subscript for a class concept includes a domain and the subscripts for a data property and an operator include the domain and a range. In this example, a type of the operator is commutative operator or a non-commutative operator and an order of assigning subscripts to the operator is based on the type of operator.

At block 314, a rule head is created based on the extracted data properties and the operators. At block 316, a rule is created using the extracted data properties, operators, class concepts, the associated subscripts and the rule head. In an embodiment, the rule is created by combining at least one of data properties, operators, class concepts, the associated subscripts with commas and an arrow before the rule head.

The order in which the method(s) are described is not intended to be construed as a limitation, and any number of the described method blocks can be combined in any order to implement the method 300, or an alternative method. Additionally, individual blocks may be deleted from the methods without departing from the spirit and scope of the subject matter described herein. Furthermore, the method 300 can be implemented in any suitable hardware, software, firmware, or combination thereof.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method for rule creation from natural language text, comprising:
   grammatically parsing, by one or more hardware processors, a rule statement in natural language text to obtain a parse tree, wherein the parse tree comprises a noun phrase core sub-tree and a verb phrase core sub-tree;
   partitioning, by the one or more hardware processors, each of the noun phrase core sub-tree and verb phrase core sub-tree into at least one sub-tree;
   extracting, by the one or more hardware processors, at least one operator using the at least one sub-tree of at least one of the noun phrase core sub-tree and verb phrase core sub-tree by:
      comparing the verb phrase with a predefined set of operators; and
      extracting the at least one operator associated with the verb phrase based on the comparison, wherein the operator is a semantic web rules language (SWRL) operator and a type of operator is one of a commutative operator and a non-commutative operator;
   simultaneously splitting, by the one or more hardware processors, the rule statement into groups of 3 adjacent words (3-grams) upon removing irrelevant words to match entities of interest with a predefined list of classes and data properties in an ontology representation;
   comparing, by the one or more hardware processors, each of the 3-grams with the predefined list of classes and data properties in the ontological representation to extract data properties and class concepts associated with the rule statement, by:
      selecting a member of the predefined list of data properties as a match when more than one word in one of the 3-grams match with the member of the predefined list of data properties; and
      selecting a member with least edit distance from the one of the 3-grams as a match when more than one member in the predefined list of data properties match with the one of the 3-grams;
   assigning, by the one or more hardware processors, subscripts to the extracted data properties, class concepts and the at least one operator, wherein an order of assigning the subscript to the at least one operator is based on the type of operator;
   creating, by the one or more hardware processors, a rule head based on the extracted data properties and the at least one operator; and
   creating, by the one or more hardware processors, a rule using the data properties, the at least one operator, the class concepts, the associated subscripts and the rule head.

2. The method of claim 1, wherein substantially simultaneously splitting the rule statement into the groups of 3-grams, comprises:
   removing one or more words from the rule statement; and
   splitting the rule statement into the groups of 3-grams upon removing the one or more words.

3. The method of claim 1, wherein the subscript for one of the class concepts comprises a domain and wherein the subscripts for one of the data properties and the at least one operator comprise the domain and a range.

4. The method of claim 1, wherein creating the rule using the data properties, at least one operator, class concepts, associated subscripts and rule head, comprises:
   creating the rule by combining the data properties, the at least one operator, the class concepts, and the associated subscripts with commas and an arrow before the rule head.

5. A system for rule creation from natural language text, comprising:
   one or more hardware processors; and
   one or more memories communicatively coupled to the one or more hardware processors, wherein the one or more hardware processors are configured to execute programmed instructions stored in the one or more memories to:
   grammatically parse a rule statement in natural language text to obtain a parse tree, wherein the parse tree comprises a noun phrase core sub-tree and a verb phrase core sub-tree;
   partition each of the noun phrase core sub-tree and verb phrase core sub-tree into at least one sub-tree;
   extract at least one operator using the at least one sub-tree of at least one of the noun phrase core sub-tree and verb phrase core sub-tree by:
      comparing the verb phrase with a predefined set of operators; and
      extracting the at least one operator associated with the verb phrase based on the comparison, wherein the operator is a semantic web rules language (SWRL) operator and a type of operator is one of a commutative operator and a non-commutative operator;
   simultaneously split the rule statement into groups of 3 adjacent words (3-grams) upon removing irrelevant words to match entities of interest with a predefined list of classes and data properties in an ontology representation;
   compare each of the 3-grams with the predefined list of classes and data properties in the ontological representation to extract data properties and class concepts associated with the rule statement, by:
      selecting a member of the predefined list of data properties as a match when more than one word in one of the 3-grams match with the member of the predefined list of data properties; and selecting a member with least edit distance from the one of the 3-grams as a match when more than one member in the predefined list of data properties match with the one of the 3-grams;

assign subscripts to the extracted data properties, class concepts and the at least one operator, wherein an order of assigning the subscript to the at least one operator is based on the type of operator; and create a rule using the data properties, the at least one operator, the class concepts, the associated subscripts and the rule head.

6. The system of claim 5, wherein the one or more hardware processors are configured to execute programmed instructions to:

remove one or more words from the rule statement; and split the rule statement into the groups of 3-grams upon removing the one or more words.

7. The system of claim 5, wherein the subscript for one of the class concepts comprises a domain and wherein the subscripts for one of the data properties and the at least one operator comprise the domain and a range.

8. The system of claim 5, wherein the one or more hardware processors are configured to execute programmed instructions to: create the rule by combining the data properties, the at least one operator, the class concepts, and the associated subscripts with commas and an arrow before the rule head.

9. A non-transitory computer readable medium embodying a program executable in computing device for rule creation from natural language text, said program comprising:

a program code for grammatically parsing a rule statement in natural language text to obtain a parse tree, wherein the parse tree comprises a noun phrase core sub-tree and a verb phrase core sub-tree;

a program code for partitioning each of the noun phrase core sub-tree and verb phrase core sub-tree into at least one sub-tree;

a program code for extracting at least one operator using the at least one sub-tree of at least one of the noun phrase core sub-tree and verb phrase core sub-tree by:

comparing the verb phrase with a predefined set of operators; and extracting the at least one operator associated with the verb phrase based on the comparison, wherein the operator is a semantic web rules language (SWRL) operator and a type of operator is one of a commutative operator and a non-commutative operator;

a program code for simultaneously splitting the rule statement into groups of 3 adjacent words (3-grams) upon removing irrelevant words to match entities of interest with a predefined list of classes and data properties in an ontology representation;

a program code for comparing each of the 3-grams with the predefined list of classes and data properties in the ontological representation to extract data properties and class concepts associated with the rule statement, by:

selecting a member of the predefined list of data properties as a match when more than one word in one of the 3-grams match with the member of the predefined list of data properties; and selecting a member with least edit distance from the one of the 3-grams as a match when more than one member in the predefined list of data properties match with the one of the 3-grams;

a program code for assigning subscripts to the extracted data properties, class concepts and the at least one operator, wherein an order of assigning the subscript to the at least one operator is based on the type of operator;

a program code for creating a rule head based on the extracted data properties and the at least one operator; and a program code for creating a rule using the data properties, the at least one operator, the class concepts, the associated subscripts and the rule head.

* * * * *